US009346422B2

(12) United States Patent
Kouzaki et al.

(10) Patent No.: US 9,346,422 B2
(45) Date of Patent: May 24, 2016

(54) ELECTRICAL JUNCTION BOX

(71) Applicant: Yazaki Corporation, Tokyo (JP)

(72) Inventors: Katsuhisa Kouzaki, Makinohara (JP); Takanori Kitajo, Makinohara (JP); Takahiro Miyakawa, Makinohara (JP); Toshihide Asano, Makinohara (JP); Kenya Sakurai, Wako (JP); Takaaki Ito, Tochigi (JP); Toshio Aikawa, Tochigi (JP); Tetsuya Goto, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/722,360

(22) Filed: May 27, 2015

(65) Prior Publication Data

US 2015/0349503 A1 Dec. 3, 2015

(30) Foreign Application Priority Data

May 28, 2014 (JP) ................................ 2014-109651

(51) Int. Cl.

*H02G 3/08* (2006.01)
*B60R 16/023* (2006.01)
*H02G 3/10* (2006.01)

(52) U.S. Cl.

CPC .............. *B60R 16/0238* (2013.01); *H02G 3/10* (2013.01)

(58) Field of Classification Search

CPC ........... H02G 3/08; H02G 3/081; H02G 3/10; H05K 5/00; H05K 5/02; H05K 5/0204; H05K 5/0073; H05K 5/0217; H01R 13/73; H01R 13/74; H01R 13/00; B60R 16/0239; B60R 16/0238

USPC ............ 174/50, 520, 535, 560, 562; 439/535, 439/949; 220/3.2, 4.02; 361/728, 600, 641, 361/730, 732, 796

See application file for complete search history.

(56) References Cited

U.S. PATENT DOCUMENTS

| | | | | |
|---|---|---|---|---|
| 6,206,726 | B1 * | 3/2001 | Takahashi | H01R 9/2458 220/3.3 |
| 7,232,950 | B2 * | 6/2007 | Kaneko | H01R 13/73 174/50 |
| 7,255,597 | B2 * | 8/2007 | Nakamura | H05K 5/0204 439/535 |
| 7,581,981 | B2 * | 9/2009 | Yamamoto | B60R 16/0239 439/475 |
| 8,269,103 | B2 * | 9/2012 | Kiyota | H05K 5/0073 174/50 |
| 8,824,151 | B2 * | 9/2014 | Ghannam | B60R 16/0239 361/728 |
| 2011/0045684 | A1 | 2/2011 | Morino et al. | |

FOREIGN PATENT DOCUMENTS

JP 2009-59664 A 3/2009

* cited by examiner

*Primary Examiner* — Angel R Estrada
(74) *Attorney, Agent, or Firm* — Sughrue Mion, PLLC

(57) ABSTRACT

An electrical junction box includes a bolt fixation portion made of resin, the bolt fixation portion having a bolt insertion hole through which a bolt is inserted to fix the electrical junction box to a vehicle. The bolt fixation portion includes a protrusion extending in an axial direction of the bolt in a state in which the bolt is inserted through the bolt insertion hole. The protrusion is configured to limit a rotationally movable range of an operating portion of a tool that is used in a state in which the operating portion extends in a direction intersecting the axial direction of the bolt.

6 Claims, 5 Drawing Sheets

17 18 19 14 15 1 6 3 2 4 5 4 5

8
7
2
3
5
6
15
14
20
1

1
15
6
12
3
14
9
4a(4)
2
4b(4)
4c(4)
4f(4)
4g(4)
5
4i(4)
4j(4)
4e(4)
4d(4)
5
4h(4)
4k(4)

6
10
11
16
III
III
θ
15
16
14
12
13
9
3
1

1
3
12
10
9
6
11
15
16
14
13

ELECTRICAL JUNCTION BOX

CROSS-REFERENCE TO RELATED APPLICATIONS

The present application claims priority from Japanese Patent Application No. 2014-109651 filed on May 28, 2014, the entire content of which is incorporated herein by reference.

FIELD OF INVENTION

The present invention relates to an electrical junction box, in particular, an electrical junction box additionally provided with anti-theft measures.

RELATED ART

An electrical junction box is an example of electric devices mounted on a vehicle such as an automobile. The electrical junction box is a generic term that encompasses a relay box, a fuse box, a junction block, an electronic control unit box and the like. Among various technologies related to electrical junction boxes, a related art electrical junction box addresses a car theft problem (see, e.g., JP2009-059664A)

An electrical junction box has, for example, a bolt fixation portion continuously provided on a resin frame, so that the electrical junction box is fixed to a vehicle by a bolt inserted through the bolt fixation portion. When the electrical junction box is released from the fixation by the bolt, the electrical junction box can be removed from the vehicle. Therefore, even a car with an electrical junction box provided with anti-theft measures can be stolen if the electrical junction box is replaced by another electrical junction box without any anti-theft measures.

SUMMARY

Illustrative aspects of the present invention provide an electrical junction box that requires time and effort to remove so as to contribute to a suppression of car theft.

According to an illustrative aspect of the present invention, an electrical junction box includes a bolt fixation portion made of resin, the bolt fixation portion having a bolt insertion hole through which a bolt is inserted to fix the electrical junction box to a vehicle. The bolt fixation portion includes a protrusion extending in an axial direction of the bolt in a state in which the bolt is inserted through the bolt insertion hole. The protrusion is configured to limit a rotationally movable range of an operating portion of a tool that is used in a state in which the operating portion extends in a direction intersecting the axial direction of the bolt.

The protrusion may be configured as a bolt surrounding wall arranged around the bolt insertion hole, and the bolt surrounding wall may have a slit configured to allow the operating portion to be inserted and removed from the slit and to limit the rotationally movable range of the operating portion.

The bolt surrounding wall may be configured to restrict an access of the tool from the direction intersecting the axial direction of the bolt.

The bolt surrounding wall may be configured to have a substantially circular shape in a plan view. The slit may be configured such that an angle formed by lines connecting a center of the bolt insertion hole and respective sides of the slit is an acute angle or a right angle.

According to the configuration described above, when releasing the electrical junction box from the bolt using the tool, it is necessary to move the operating portion many times because the rotationally movable range of the operating portion of the tool is limited by the protrusion of the bolt fixation portion. As a result, it requires time and effort to remove the electrical junction box, and can contribute to a suppression of theft. In addition, due to a simple structure in which the protrusion is formed on the bolt fixation portion, it is possible to contribute to a suppression of theft without increasing the number of components.

For example, the rotationally movable range of the operating portion of the tool may be limited by the slit of the bolt surrounding wall, so that it requires the operating portion to be moved many times. Also with this configuration, due to a simple structure in which the bolt fixation portion has the bolt surrounding wall provided in a protruded manner with the slit formed therein, it is possible to contribute to a suppression of theft without increasing the number of components.

When the bolt surrounding wall is configured to limit the direction in which the tool is accessible, it requires additional time and effort to remove the electrical junction box from the bolt, unless the regular access direction is available for the tool. This can further contribute to a suppression of theft.

Also, by narrowing the rotationally movable range of the operation portion of the tool, it is possible to cause further time and effort to remove the electrical junction box, and to contribute to a suppression of theft.

DETAILED DESCRIPTION

Hereinafter, an exemplary embodiment of the present invention will be described in detail with reference to the drawings. However, the following exemplary embodiment does not limit the scope of the claimed invention.

According to an exemplary embodiment of the present invention, an electrical junction box has a bolt fixation portion made of resin. A bolt is inserted through the bolt fixation portion so that the electrical junction box is fixed to a vehicle. The bolt fixation portion is formed with a bolt surrounding wall in a protruded manner A slit is provided in the bolt surrounding wall. The slit is configured such that an operating portion of a tool can be inserted and removed from the slit when using the tool in a state in which the operating portion extends in a direction intersecting an axial direction of the bolt. The slit is also configured to limit a rotationally movable range of the operating portion. Because the rotationally movable range of the operating portion of the tool is limited by the bolt surrounding wall and the slit, it is necessary to move the operating portion of the tool a number of times. As a result, it is possible to contribute to a suppression of theft.

Figure 1B:
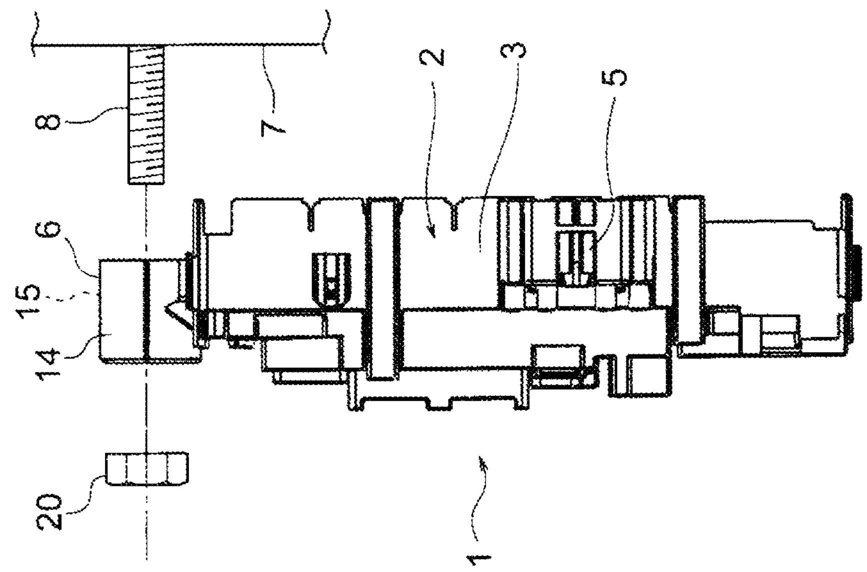
FIG. 1B is a side view of the electrical junction box.
Figure 1A:
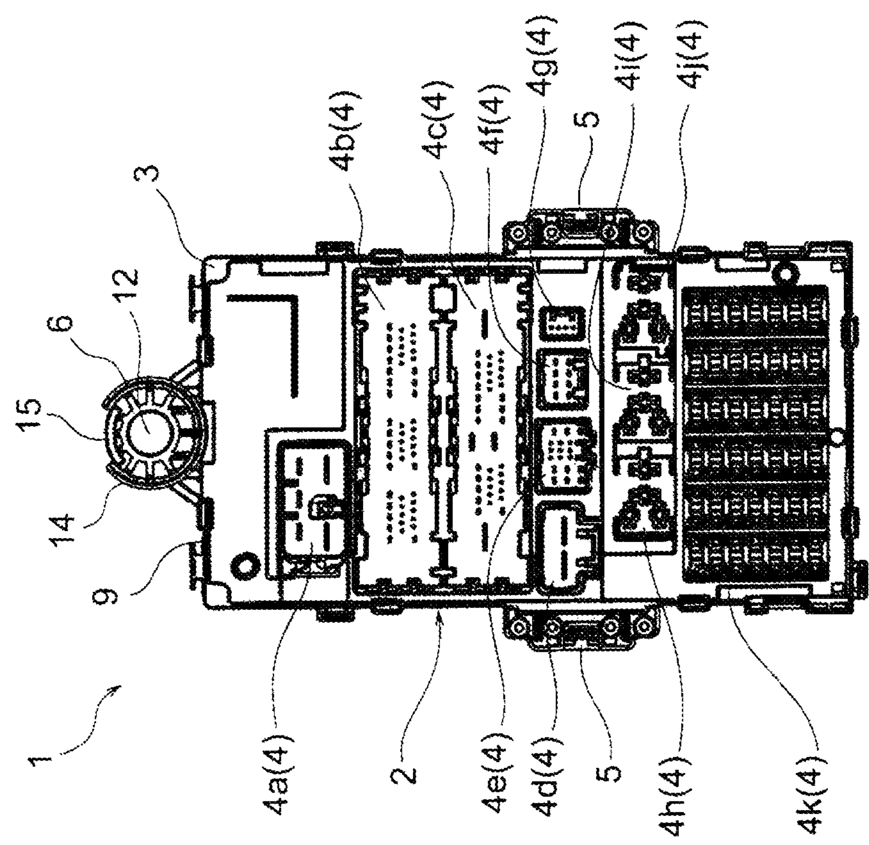
FIG. 1A is a plan view of an electrical junction box according to an exemplary embodiment of the present invention.
Figure 2:
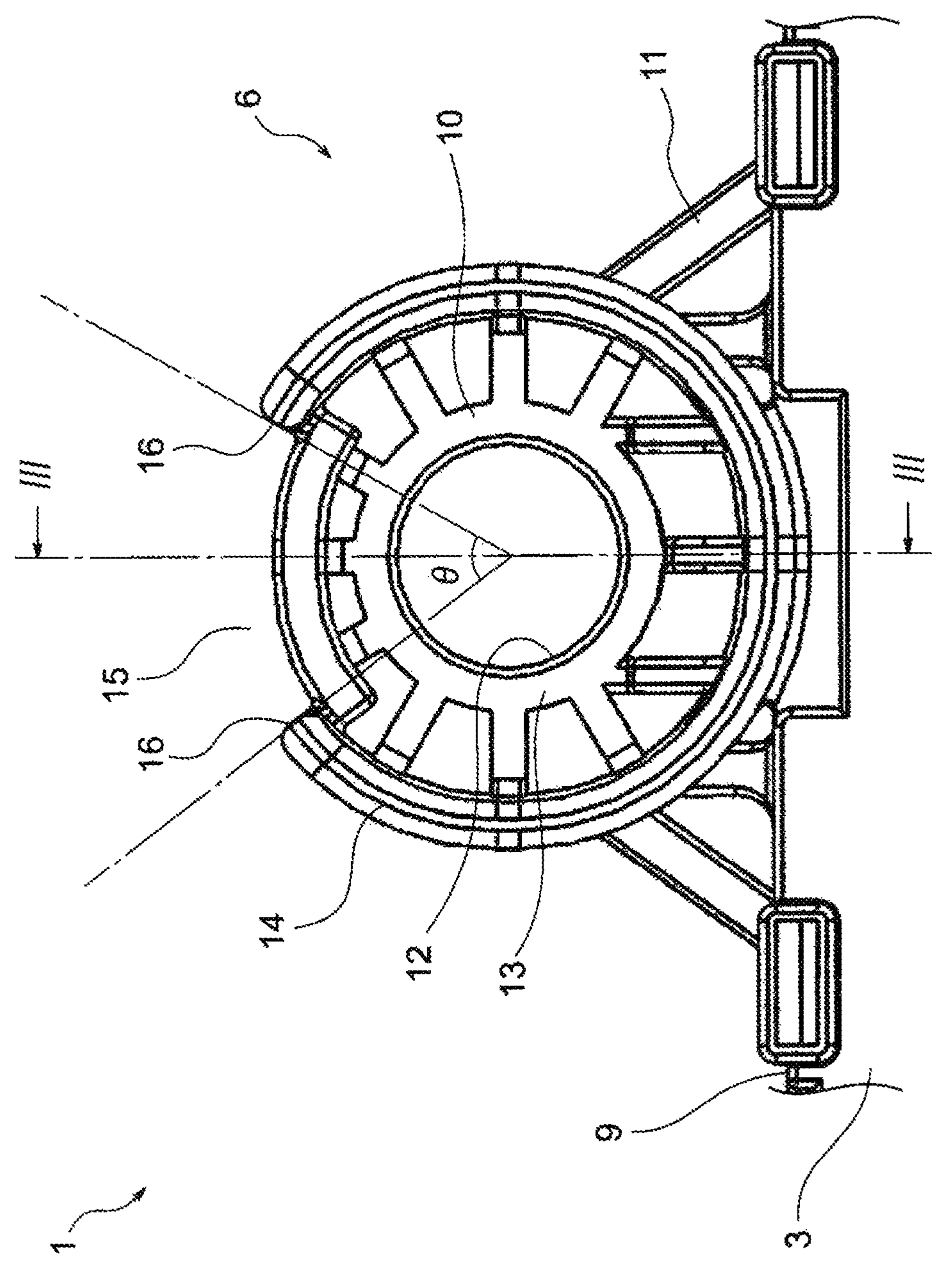
FIG. 2 is an enlarged view of a bolt fixation portion of the electrical junction box.
Figure 3:
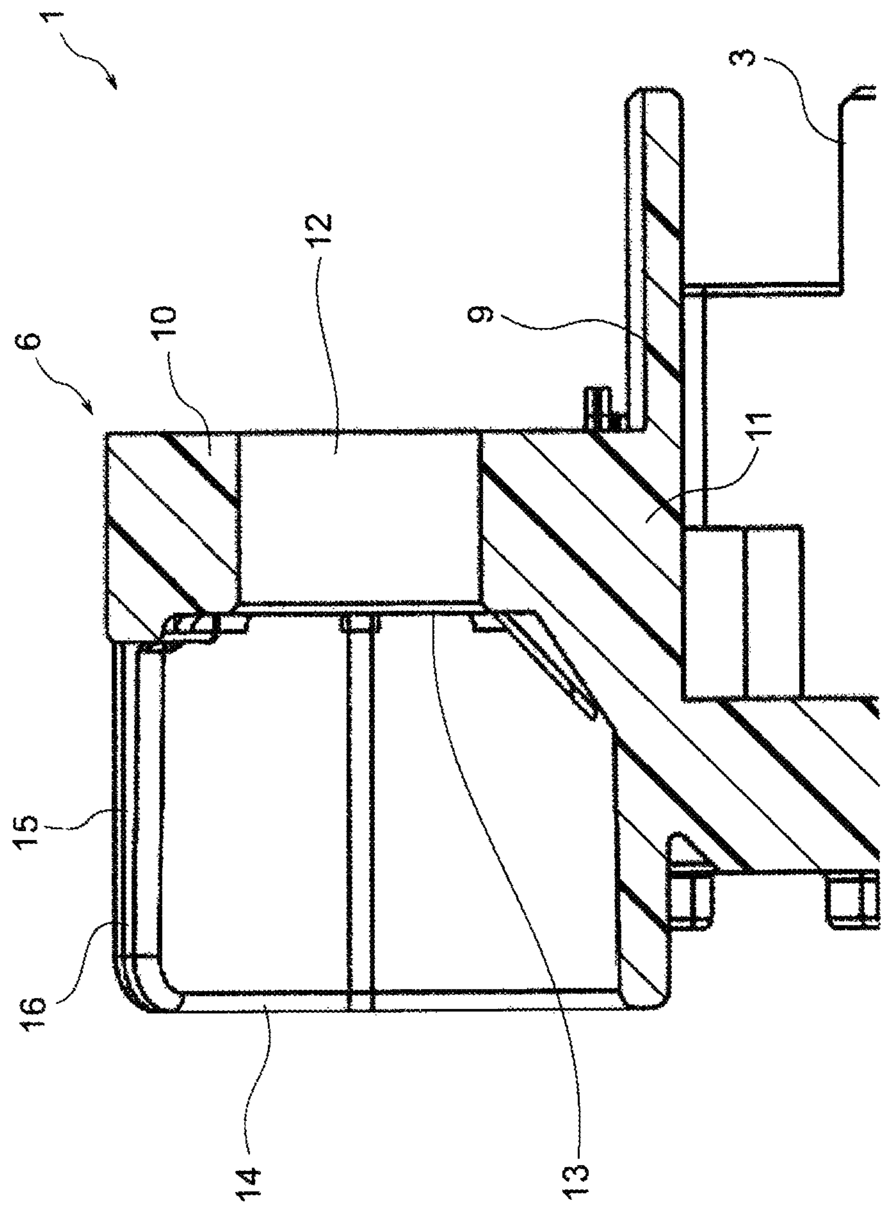
FIG. 3 is a sectional view taken along the line of FIG. 2.

As shown in FIGS. 1A and 1B, an electrical junction box 1 is configured to be mounted on a vehicle such as an automobile. The electrical junction box 1 includes an electrical junction portion 2 and an outer cover (not shown). The electrical junction portion 2 includes a frame 3 made of electrically insulating resin, and an internal circuit provided inside the frame 3. The electrical junction portion 2 is configured such that various electrically conductive terminals of the internal circuit are arranged at respective connection portions 4 (4*a*-4*k*) of the frame 3 so as to be electrically connected to relays, fuses, connectors at wire harness terminals or the like (not shown). Because such electrical connections may be similar to those of well-known electrical junction boxes, a detailed description thereof will be omitted here.

A pair of bracket fixation portions 5 and a bolt fixation portion 6 are provided on the frame 3. The frame 3, the bracket fixation portions 5, and the bolt fixation portion 6 are integrally formed as a one-piece structure. The bracket fixation portions 5 are configured to be fixed to a bracket (not shown) by being inserted into the bracket. The bolt fixation portion 6 is configured such that a stud bolt 8 (an example of a bolt) provided to protrude from a body 7 of a vehicle is inserted through the bolt fixation portion 6, and such that the bolt fixation portion 6 is securely fastened by a nut 20. The bolt fixation portion 6 may be configured such that it is fastened using a different type of bolt, such as a hexagon head bolt. The electrical junction box 1 is fixed to the vehicle via the bracket fixation portions 5 and the bolt fixation portion 6. The illustrated arrangement relating to the fixation is merely an example.

As shown in FIGS. 1A to 3 for example, the bolt fixation portion 6 is provided continuously from one side wall 9 of the frame 3. More specifically, the bolt fixation portion 6 includes a fixation body portion 10 having a substantially circular shape in a plan view, and a body connection portion 11. The fixation body portion 10 is provided continuously from the side wall 9 via the body connection portion 11. The body connection portion 11 is configured to have sufficient strength so as not to be damaged by an unintended external force applied thereto. The fixation body portion 10 provided continuously from this body connection portion 11 is formed with a bolt insertion hole 12. The bolt insertion hole 12 is formed to extend through a center of the fixation body portion 10 in a circular shape. The stud bolt 8 is inserted into the bolt insertion hole 12.

A nut receiving surface 13 is provided adjacent to the bolt insertion hole 12. In the exemplary embodiment, the nut receiving surface 13 is configured as a surface on which the nut 20 is received in a contacting manner when the nut 20 is fastened. When a hexagon head bolt is used, the nut receiving surface 13 is configured to receive a bolt head portion or a washer.

A bolt surrounding wall 14 (an example of a protrusion) is formed along an outer edge of the fixation body portion 10. The bolt surrounding wall 14 is provided to protrude in an axial direction of the stud bolt 8. The bolt surrounding wall 14 has a substantially circular shape in a plan view. The bolt surrounding wall 14 is arranged to surround the stud bolt 8. In other words, the bolt surrounding wall 14 is arranged to surround the nut 20 screwed onto the stud bolt 8. That is, the bolt surrounding wall 14 is provided to extend around the stud bolt 8 and the nut 20. The circular shape is merely an example. The shape of the bolt surrounding wall 14 may be, for example, rectangular in so far as it surrounds the stud bolt 8 and the nut 20.

A slit 15 is provided in the bolt surrounding wall 14. The slit 15 is configured such that an operating portion 19 of a tool 17 (see FIG. 4A) can be inserted and removed, as will be described below, and also to limit the rotationally movable range of the operating portion 19. The slit 15 is configured such that an angle 0 formed by lines connecting the axis of the bolt 8 (or the center of the bolt insertion hole 12) and the respective sides 16, 16 of the slit 15 is an acute angle or a right angle. The angle 0 may be an obtuse angle close to a right angle, but the effect that will be described below is reduced. The slit 15 is formed such that a corresponding portion of the bolt surrounding wall 14 is cut out from the protruding end of the bolt surrounding wall 14 to the fixation body portion 10. In the exemplary embodiment, the slit 15 is provided at the farthest position from the side wall 9. However, this is merely an example.

Figure 4A:
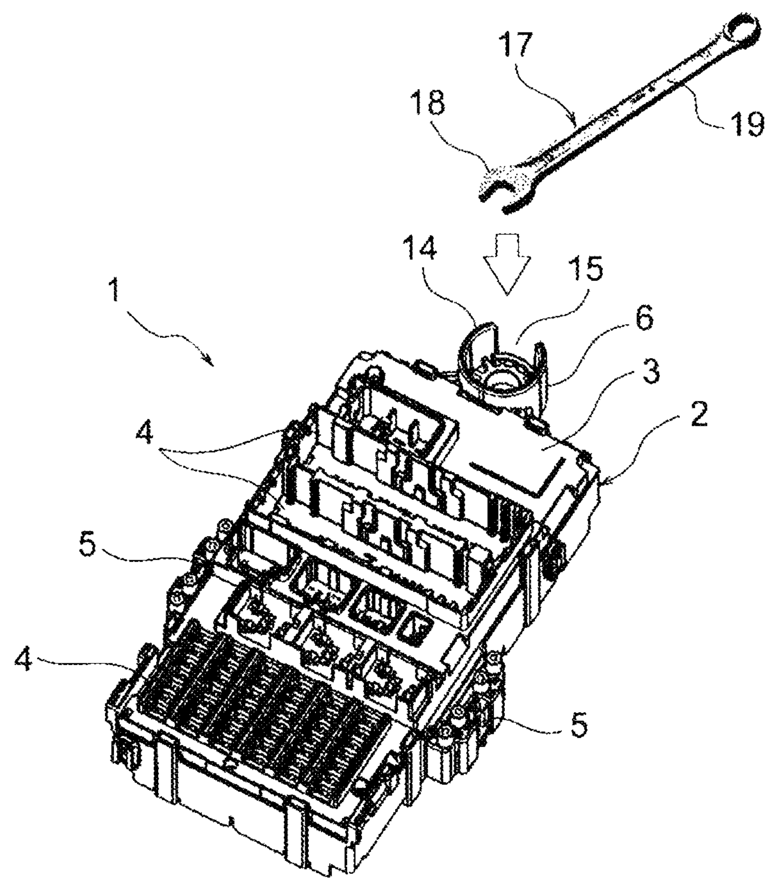
FIG. 4A is a perspective view of the electrical junction box.
Figure 4B:
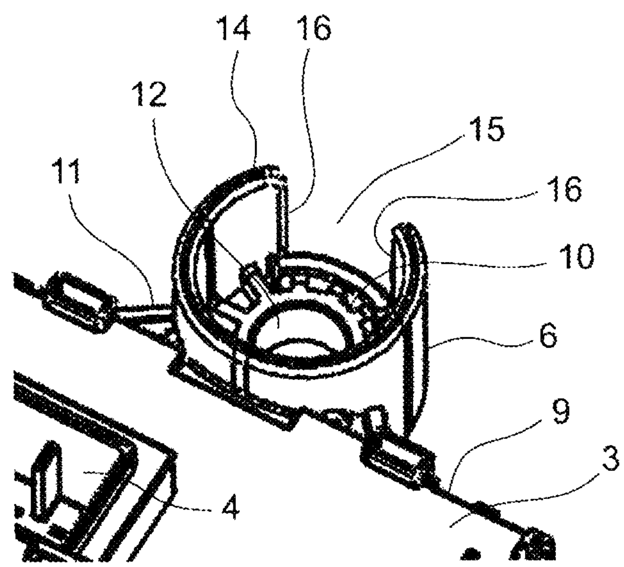
FIG. 4B is an enlarged perspective view of the bolt fixation portion.

FIG. 4A shows a tool 17. In this example, the tool 17 is a wrench having an action portion 18 and an operating portion 19.

Figure 5A:
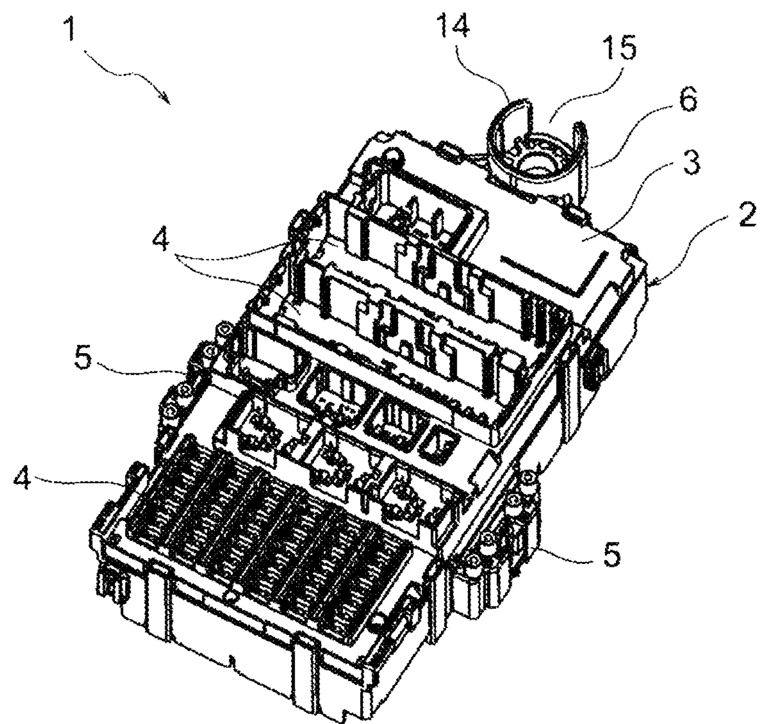
FIG. 5A is a perspective view of the electrical junction box.
Figure 5B:
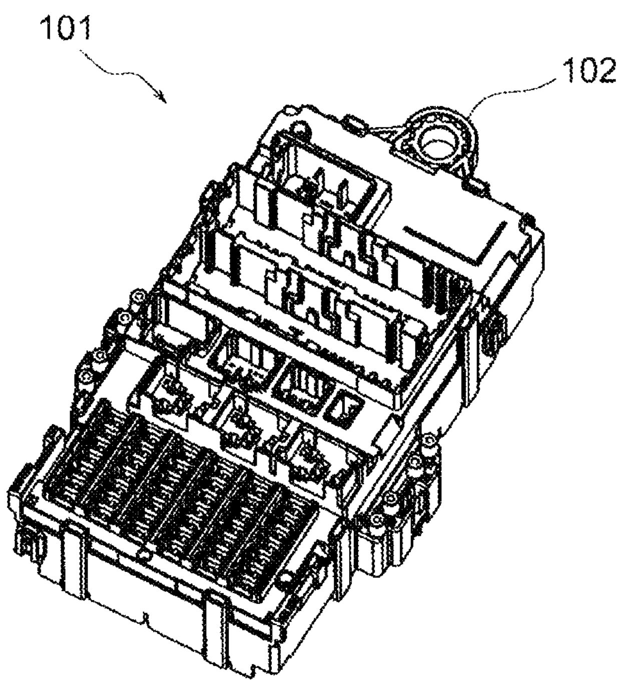
FIG. 5B is a perspective view of an electrical junction box according to a comparative example.

According to the configuration described above, when using the tool 17, the rotationally movable range of the operating portion 19 is limited. More specifically, the fixation body portion 10 has the bolt surrounding wall 14 provided in a protruded manner to surround the stud bolt 8 and the nut 20, and the slit 15 is formed in the bolt surrounding wall 14 so as to extend parallel to the axis of the stud bolt 8. Accordingly, when the action portion 18 is engaged with the nut 20, the operating portion 19 is movable only between the sides 16, 16 of the slit 15. That is, the rotationally movable range of the operating portion 19 is limited. Also, when using the tool 17, the action portion 18 cannot be engaged with the nut 20 unless the action portion 18 is moved along the axis of the stud bolt 8. This is because, when an attempt is made to access from a direction intersecting the axis of the stud bolt 8, the engagement between the action portion 18 and the nut 20 is prevented due to the presence of the bolt surrounding wall 14. Accordingly, when one tries to remove the electrical junction box 1 with an intention of theft, it requires time and effort firstly because the electrical junction box 1 cannot be removed unless the action portion 18 is moved along the axis of the stud bolt 8. Further, the operating portion 19 needs to be moved in a rotating direction a number of times to remove the electrical junction box 1. This requires additional time and effort. Comparing the electrical junction box 1 of FIG. 5A and an electrical junction box 101 of FIG. 5B as a comparative example, and the electrical junction box 1 requires more time and effort to remove. The electrical junction box 101 according to the comparative example is provided with a simple bolt fixation portion 102 where the bolt surrounding wall 14 and the slit 15 are not provided. In the exemplary embodiment, the slit 15 is formed at the angle 0 described above. However, because the operating portion 19 has its thickness, the movable range is naturally narrower than the angle θ.

According to the exemplary embodiment described above with reference to FIG. 1A to FIG. 5A, the bolt surrounding wall 14 and the slit 15 are formed in the bolt fixation portion 6 so that it requires time and effort to remove as described above. As a result, it is possible to contribute to suppression of theft.

In addition, due to the simple structure in which the bolt surrounding wall 14 and the slit 15 are formed in the bolt fixation portion 6, it is possible to contribute to suppression of theft without increasing the number of components.

In particular in a case in which other on-vehicle devices, a portion of the vehicle body or the like is not present in the movable range of the tool 17 such as a wrench shown in FIG. 4A, it is possible to restrict the movable range of the tool 17 for unfastening the bolt.

The slit 15 according to the exemplary embodiment described above is an example of a movable range limiting portion configured to limit the rotationally movable range of the operating portion 19.

While the present invention has been described with reference to a certain exemplary embodiment thereof, the scope of the present invention is not limited to the exemplary embodiment described above, and it will be understood by those skilled in the art that various changes and modifications may be made therein without departing from the scope of the present invention as defined by the appended claims.

What is claimed is:

1. An electrical junction box comprising a bolt fixation portion made of resin, the bolt fixation portion having a bolt insertion hole through which a bolt is inserted to fix the electrical junction box to a vehicle, wherein the bolt fixation portion comprises a protrusion extending in an axial direction of the bolt in a state in which the bolt is inserted through the bolt insertion hole, and wherein the protrusion is configured to limit a rotationally movable range of an operating portion of a tool that is used in a state in which the operating portion extends in a direction intersecting the axial direction of the bolt to a range of rotational movement that is an acute angle or a right angle.

2. The electrical junction box according to claim 1, wherein the protrusion is configured as a bolt surrounding wall arranged around the bolt insertion hole, and wherein the bolt surrounding wall has a slit configured to allow the operating portion to be inserted and removed from the slit and to limit the rotationally movable range of the operating portion.

3. The electrical junction box according to claim 2, wherein the bolt surrounding wall is configured to restrict an access of the tool from the direction intersecting the axial direction of the bolt.

4. The electrical junction box according to claim 2, wherein the bolt surrounding wall is configured to have a substantially circular shape in a plan view.

5. The electrical junction box according to claim 2, wherein the slit is configured such that an angle formed by lines connecting a center of the bolt insertion hole and respective sides of the slit is an acute angle or a right angle.

6. The electrical junction box according to claim 1, wherein the bolt fixation portion further comprises a radial wall extending outward in a radial direction from the bolt insertion hole and the protrusion extends in the axial direction from the radial wall.

* * * * *